United States Patent [19]

Stamp et al.

[11] Patent Number: 5,503,877
[45] Date of Patent: Apr. 2, 1996

[54] COMPLEX OLIGOMERIC OR POLYMERIC COMPOUNDS FOR THE GENERATION OF METAL SEEDS ON A SUBSTRATE

[75] Inventors: Lutz Stamp; Elisabeth Zettelmeyer; Heinrich Meyer; Gonzalo U. Desmaison, all of Berlin, Germany

[73] Assignee: Atotech Deutschalnd GmbH, Berlin, Germany

[21] Appl. No.: 337,669

[22] Filed: Nov. 10, 1994

Related U.S. Application Data

[63] Continuation-in-part of Ser. No. 857,925, May 18, 1992, abandoned.

[30]     Foreign Application Priority Data

Nov. 17, 1989 [DE]   Germany ........................... 39 38 710.0

[51] Int. Cl.⁶ .............................. B05D 3/00; B05D 3/12
[52] U.S. Cl. ........................ 427/328; 427/340; 427/341; 427/96; 427/98
[58] Field of Search .................... 427/328, 340, 427/341, 96, 98

[56]             References Cited

U.S. PATENT DOCUMENTS 4,248,632  2/1981  Ehrich et al. .

5,165,971  11/1992  Falletti .

FOREIGN PATENT DOCUMENTS 317092  5/1989  European Pat. Off. .

OTHER PUBLICATIONS

F. A. Cotton and G. Wilkinson, "Anorganische Chemie", Eine Zusammenfassende Darstellung fur Fortgeschrittene, pp. 773, 774, 776 and 969 (1985).

D. H. Williams and I. Flemming, "Spektroskopische Methoden in Der Organischen Chemie", pp. 11 and 19, 1977.

J. D. Roberts and M. E. Caserio, "Basic Principles of Organic Chemistry", pp. 1420 and 1421 (1977).

*Primary Examiner*—Ponnathapura Achutamurthy
*Attorney, Agent, or Firm*—Paul & Paul

[57]              ABSTRACT

Complex compounds are disclosed comprising a metal of the 8th to 11th groups of the Periodic Table with at least one organic ligand, wherein the complex exists in an oligomeric or polymeric form, and the organic ligand preferably contains at least one N or O atom, or a multiple bond, or several of these elements. The complex compounds are useful for the generation of metal seeds on a non-metallic substrate.

21 Claims, No Drawings

COMPLEX OLIGOMERIC OR POLYMERIC COMPOUNDS FOR THE GENERATION OF METAL SEEDS ON A SUBSTRATE

CROSS REFERENCE TO RELATED APPLICATIONS

This application is a continuation-in-part of U.S. application Ser. No. 07/857,925, filed May 18, 1992, now abandoned, which is incorporated herein by reference.

FIELD OF THE INVENTION

The invention concerns new, complex compounds, solutions of which can be utilized to generate metal seeds (after appropriate reduction), particularly on non-metallic surfaces. This seed formation on substrate surfaces frequently serves as preparation for subsequent chemical metallization (if necessary, with galvanic reinforcement) of nonconductors. This processing step is of great importance, especially in the manufacture of printed circuits for the electronics industry.

Other areas of application included decorative and functional metallization, as in the automobile and fixtures industries, as well as the manufacture of chip carriers, hybrid circuits, optical data media, and shielding for cases and components in the electronics industry.

BACKGROUND OF THE INVENTION

Two fundamentally different processes are known for seed formation on nonconductive substrates. One process starts with a solution containing colloidal metal particles, and deposits these particles as seeds directly on the substrate surface.

The other process contains the metal in the form of a soluble compound, and the metal is first deposited onto the surface in this form. The deposited metal compound is then reduced in a separate reduction step, and the metal seeds are formed directly on the surface.

One disadvantage of the known methods, however, is that with a two-stage process using a compound such as palladium chloride as the precious metal salt and tin (II) chloride, for instance, as the reducing agent, one can only activate unlaminated (i.e., free of copper metal) substrate material; otherwise, the precious metal will precipitate on (become cemented to) the copper laminate.

Simple metal salts and monomeric metal complexes also do not adsorb particularly well on many materials; or they adsorb sufficiently well only in solutions with high concentrations of the metal compound. Yet adsorbates applied to a surface in this way desorb very easily (e.g., in rinsing operations) and so do not adhere very strongly to surfaces.

Activation solutions which contain both the precious metal salt and the reducing agent (so-called colloidal activators), however, are highly sensitive to foreign ions and other contaminants, which leads to irreversible coagulation of the precious metal. Moreover, such activation solutions in which tin (II) compounds act as both reducing agent and protective colloid are unstable in comparison to oxidation by means of atmospheric oxygen, and require a continual, measured addition of the reducing agent.

These activation solutions also have the disadvantage of working at strongly acidic pH values. In the case of multiple layers, this frequently results in damage to the black/brown oxide layer in the area of the boreholes, and thus to the so-called red ring phenomenon.

All activator solutions used up to now in industrial applications share the disadvantage of working only in a rather small pH range; therefore, they require expensive controls and monitoring.

SUMMARY OF THE INVENTION

An object of the invention is to provide a substance for a stable activation solution which does not damage the substrate material to be metallized, and in particular does not damage the material's bonding sites; which is easy to apply; and which exhibits a high degree of adsorption for all non-metallic, substrate materials.

Another object of the invention is to provide a process for generation of metal seeds on a substrate, the process comprising:

(a) combining organic ligands comprising at least one element selected from N and O with a solution comprising a salt of at least one metal selected from the group consisting of Pd, Cu, Ag, Au, Ni, Pt, Ru, Rh, Os and Ir in water, organic solvent, or mixture thereof;

(b) heating the solution for a sufficient time for the formation of an oligomeric or polymeric complex compound comprising said organic ligands and said metal;

(c) contacting a substrate with said complex compound solution;

(d) allowing sufficient time for complex compounds of said solution to adsorb onto said substrate;

(e) rinsing surplus solution from said substrate; and (f) contacting said substrate with a reducing agent to form said metal seeds on said substrate.

A further object of the present invention is to provide an oligomeric or polymeric complex compound of the formula $((ML_nS_y)^{m\pm})_x$, wherein M is selected from the group consisting of Pd, Cu, Ag, Au, Ni, Pt, Ru, Rh, Os, Ir and combinations thereof, L is selected from the group consisting of N-containing organic ligands, O-containing organic ligands and combinations thereof, S is a solvent molecule or ion derived therefrom by protonation or deprotonation, n is a number from 0.5 to 6, y is a number from 0 to 6, m is a number from 0 to 3, and x is a number from 3 to 10,000.

DETAILED DESCRIPTION OF THE PREFERRED EMBODIMENTS

The complex compounds of the present invention are of the formula $((ML_nS_y)^{m\pm})_x$. M is selected from metals of the 8th to 11th group of the Periodic Table, preferably Pd, Cu, Ag, Au, Ni, Pt, Ru, Rh, Os and Ir. Palladium is a particularly preferred metal. L is preferably selected from organic ligands comprising at least one element selected from N and O. S is a solvent molecule or ion derived therefrom by protonation or deprotonation. In the above formula, n may range from 0.5 to 6, y may range from 0 to 6, m may range from 0 to 3, and x may range from 3 to 10,000. In accordance with the present invention, each monomeric portion of the oligomeric/polymeric complex compound comprises a central ion of the metal M between or surrounded by the organic ligands.

In accordance with the present invention, the following preferred complex compound formulations and ligand formulations are provided.

Alternate 1

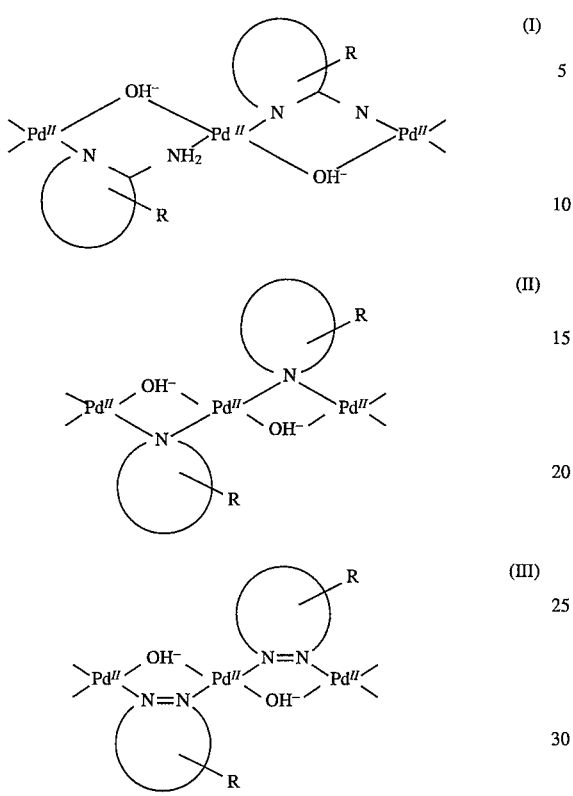

Alternate 2

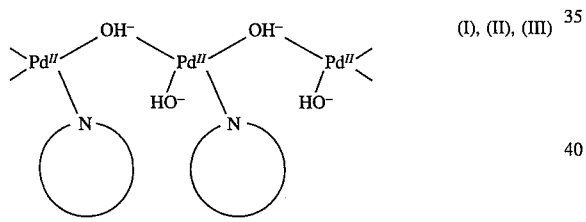

The following ligands are preferred for use in accordance with the present invention.

2-amino-3-methylpyridine

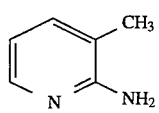

2-amino-4-methylpyridine

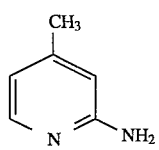

2-amino-6-methylpyridine

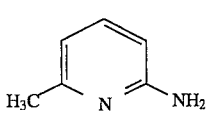

N-acetyl-2-amino-6-methylpyridine

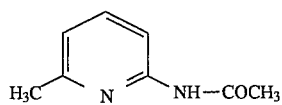

2-amino-4-hydroxy-6-methylpyrimidine

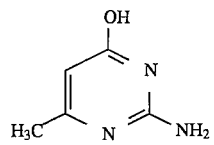

5-amino-3,4-dimethylisoxazole

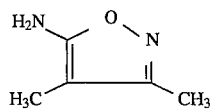

2-amino-4,6-dimethylpyridine

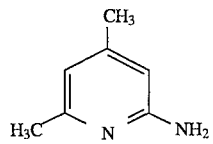

3-ethylpyridine

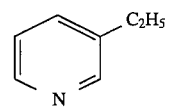

3-hydroxymethylpyridine

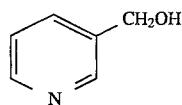

2,2'-dipyridyl

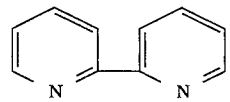

DL-alanine $CH_3CH(NH_2)COOH$ piperazine

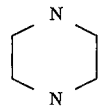

phthalazine

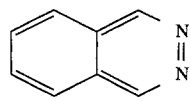

-continued cinnoline

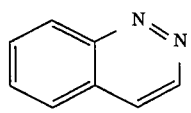

pyridazine

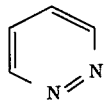

Monomeric complexes of palladium and other metals which contain ligands other than those specified in the invention, such as solvent molecules or ions derived therefrom by processes such as protonation or deprotonation, surprisingly can be converted to stable solutions of oligomeric metal complexes through establishment of bonds between these molecules or ions derived therefrom. The individual metal atoms are connected by individual molecules or ions coordinated with them as bridging ligands. Therefore, these complexes are fundamentally different, in terms of their chemical structure and properties, from complexes in which metal atoms are bonded to oligomeric/polymeric organic molecules, as is described, for instance, in EP 82438.

The oligomeric metal complexes of the invention exhibit an extraordinary capacity to adsorb on nearly all non-metallic materials, including materials that are important in the manufacture of printed circuit boards, such as epoxy resin, polyimide and glass, as well as other synthetics such as acrylonitrile-butadiene-styrol copolymerisates (ABS), polyamide, polycarbonate, polyphenyleneoxide, polyethersulfone, polyetherimide, and on ceramics such as aluminum oxide and aluminum nitride, and on mixtures of these materials. Even diluted solutions yield unusually strong and adhesive coatings on the surfaces of non-metals. On metallic surfaces such as copper, however, there is hardly any adsorption; in particular, cementation does not occur with metal deposition. For this reason, the complexes of the invention are outstanding when used in processes for the metallization of non-metal/metal composite materials.

Thus the activator used according to the invention has none of the disadvantages that are necessarily associated with the traditional systems. By virtue of its oligomeric structure, it exhibits great affinity to diverse, substrate materials; and the precious metal seeds that are formed are very active, so that extremely thick metal coats can be achieved with this type of activation. This is extremely important in the most diverse applications. In the metallization of any given plastic parts which have heterogenous surfaces—because of different processing conditions, for instance—or which have different surface morphologies from part to part, an extremely thick and active activation coating is important, and can be achieved with the complexes of the invention. In electronic applications, the reliability of electrical circuits which have a dense and adhesive metal deposit on through-plated boreholes, is determined by the peculiar chemical composition of the synthetic substrate, which varies from case to case; here too, a high degree of activity and a high coating density of the metal particles of the activator system are required, such as are generated by the metal complexes of the invention in the manner described. This is especially true of the diverse materials in these composite substrates, such as those which are used for the highly complicated, multi-layer circuits for the electronics industry.

Such activators do not attack either substrate materials or, in particular, their bonds, since they are manufactured without halogen and can be operated in a wide pH range from alkaline to weakly acidic.

The solutions of such activators are very stable. Shelf lives of several years are possible before a new make up becomes necessary. The lack of susceptibility to oxidation by atmospheric oxygen deserves special emphasis; this characteristic has become much more important of late, and will become increasingly important since in modern production lines the treatment solutions are applied with surge or spray nozzles.

In this way, the activation solution comes into very close contact with atmospheric oxygen. Solutions, such as activation solutions containing tin (II) compounds, which are oxidized under these conditions and thus are unstable, cannot be used in such modern plants. The activator of the invention, however, which is fully inert to oxidation by atmospheric oxygen, is very well suited to use with surge or spray techniques.

This property constitutes a clear advantage over other known processes including the traditional immersion technique. No chemicals need be added because they are not consumed through atmospheric oxidation.

Solutions of such oligomeric metal complexes are therefore especially well suited to activation of substrate materials for making conductor pathways and for activation of boreholes for the purpose of establishing through-connections in the manufacture of printed circuits.

The application of solutions of oligomeric/polymeric metal complexes is usually preceded by pretreatment of the materials/objects to be seeded. This serves to clean the surfaces and/or to help prepare the surface for adsorption through mechanical or chemical means. The materials/objects to be seeded are then treated with a solution of the oligomeric/polymeric metal complexes of the invention in the actual activation stage. This can be accomplished by immersion, but also by spraying, surge or other techniques. The reaction time of the solution on the surface ranges from 10 seconds to 30 minutes. This process results in strong adsorption of the metal complex on the surface. Surplus solution is then removed in a rinsing step (for example, in a standing rinse, circulation rinse or spray rinse).

The adsorbed metal complex remains firmly fixed to the surface of the substrate which is to undergo activation. Next, the substrate is treated with a solution of a reducing agent (preferably from approximately 10 seconds to 30 minutes). This can be accomplished by immersion, rinsing, surge or other techniques. In this process, the adsorbed complex is destroyed by reduction, and highly active metal seeds are formed which remain firmly fixed to the substrate surface. Surplus reducing agent can then be rinsed off.

Reducing agents well suited to this task are, for example, borohydrides such as $NaBH_4$, or borane-amine complexes, especially dimethylaminoborane, phosphinic acid or their salts, formaldehyde, hydrazine or others, and mixtures of these reducing agents. In selecting the appropriate complex ligands, the reducing agent of the currentless electrolyte used in the subsequent step can also be utilized for the reduction. The complex disintegrates in the process to soluble components and highly active metal particles.

The degree of oligomerization of the relevant metal complex exerts considerable influence on the activity of the metal particles that are generated because this factor partially determines the size and morphology of the metal particles formed in the reduction. The degree of oligomerization of the complex compounds lies between 3 and 10,000 monomeric units; complex compounds with 5 to 500 monomeric units are especially suitable.

The oligomeric character of the formed molecules can be demonstrated with techniques such as light scattering measurements. This method can also be used to ascertain the average degree of oligomerization. The size of the oligomeric molecules can be regulated through adjustment of the reaction conditions under which they form bonds (time, temperature, concentration, pH), and by the nature of the precious metal ions and their ligands that are used. The desired molecular weight can be attained through an appropriate combination of parameters.

The activation baths that are produced with these oligomeric complexes can then be utilized under extremely diverse conditions to satisfy the relevant requirements. Their mode of action is effective over a broad range of working conditions (especially pH value). The robust nature of the baths used with the activators of the invention means reduced expenditures for control, and so lower costs, with no loss of quality in production. The activation of non-metallic substrates achieved with the activators that are generated from the complex compounds of the invention can be utilized for currentless metallization with diverse metal coatings, which in turn can be metallized using either galvanic techniques or without foreign current. Metals which can be deposited on substrates using the activation technique of the invention include copper, nickel, gold, palladium, silver, cobalt, zinc or alloys of these metals, or alloys with elements such as phosphorous or boron, as with the Ni/P and Ni/B systems.

Furthermore, it was demonstrated that other substances added for technical reasons in the preparation of solutions of oligomeric/polymeric complex compounds can have a positive or negative influence on the capacity of these solutions to activate non-metallic substrates. Noteworthy in this regard are substances for buffering the system at certain pH values, such as borates, carbonates, phosphates and acetates. The type of acid used in the preparation of solutions (e.g., hydrochloric acid, sulfuric acid, acetic acid) can also be important. Thus in Example 1 (see below), the boric acid added during preparation improved the efficacy of the activator solution thereby obtained in comparison to a solution without this additive, or compared with a solution in which phosphate, for instance, was used as a buffer.

It is especially advantageous to produce the oligomeric metal complexes of the invention in the solvent (or in some of the solvent components) that is later used in the application of the solution for the activation. In this case, it is not necessary to isolate (intermediate) products, which makes the preparation of activator solutions extremely simple. Below we describe one example of a preparation procedure by which the oligomeric metal complexes of the invention can, in principle, be produced (other preparation methods are also possible). The calculated quantity of the ligand is added to a salt or an appropriate starting complex compound of the relevant metal in suitable solvents such as water, or organic solvents such as aliphatic alcohols, alcohol ethers such as ethylene glycol monoethers, or ethers such as ethylene glycol diethers, or mixtures thereof. These solvents are suitable for use in the formula $((ML_nS_y)^{m\pm})_x$ of the present invention. The solvent S is preferably a compound with electron donating properties, such as O-containing and N-containing compounds. Suitable solvents may also include an inorganic ion of an acid such as chloride and sulfate ions, and an organic ion of an acid such as formate, acetate and propionate ions.

In many cases, the desired complex formation occurs spontaneously; in other cases, the solution is brought to the temperature required to start a reaction. After the reaction is completed, the monomeric complex can be isolated by techniques such as evaporation of the solvent. In order to prepare a solution of the corresponding oligomeric complex, one dissolves the monomeric complex in the desired solvent, sets the requisite reaction parameters, especially the pH value, to the values required for the relevant product, and heats the solution until equilibrium is attained (normally several hours) at approximately 50° to 70° C. As a rule, it is not possible to separate the oligomeric/polymeric complex thereby generated from the solution. The conditions needed to isolate the complexes in solid form normally lead to changes in the size and chemical structure of the molecules. Therefore, characterization of the complexes depends exclusively on spectroscopic or other in-situ methods in the solution. The structure of the oligomeric compounds thereby generated can be characterized by the ligands and/or solvent molecules or solvent ions which bridge between the metal atoms, resulting in a long string.

Suitable metals include Cu, Ag, Au, Ni, Pd, Pt, Ru, Rh, Os, and Ir, with Pd being particularly preferred. The metals themselves, their salts, or other complex compounds of the relevant elements can be utilized as the starting complex compound for preparation of the complex compounds of the invention.

Compounds which typically form monomeric complexes with metal ions are used as ligands in the preparation of the complex compounds of the invention. Compounds with one or several N, O, S or P atoms, or one or several multiple bonds, or several of these elements at the same time, are suitable. Organic ligands containing N and/or O are preferred. Particularly suitable in this regard are compounds of the nitrogen-heterocycle group, such as pyridines, pyridazines, pyrimidines, pyrazines, quinolines, cinnolines or phthalazines. In addition to ring-containing or heterocyclic compounds, aliphatic compounds such as primary, secondary and tertiary aliphatic amines may be used as the organic ligands, as long as the nitrogen in these compounds does not carry a positive charge as in quaternary nitrogen compounds.

For use as activators, the complexes of the invention are dissolved in the solvent at concentrations of 1 to 10,000 mg/l, preferably at concentrations between 20 and 500 mg/l. Determining factors for the optimal concentration are dependent on the specific application; the choice of procedural parameters, such as temperature, treatment time, etc., type of substrate, type of complex and adequate adsorption of the complex on the substrate that will undergo activation.

In principle, any solvent or solvent mixture which can solubilize the oligomeric/polymeric metal complexes of the invention sufficiently well for generation of the effect can be utilized for application of said complexes. It is much more preferable to use the same solvent as that used for the preparation; that is, a solvent of the group of alcohols, glycols, alcohol ethers or ethers, but especially water.

The pH value of the solutions utilized for activation can lie between 1 and 14, preferably between 5 and 12. It can be adjusted to the desired value through addition of acids, such as sulfuric acid, hydrochloric acid, nitric acid, phosphoric acid or acetic acid; or, depending on the desired pH value, through addition of lyes such as soda lye, potash lye or ammonia.

The following examples describe the preparation of some solutions containing oligomeric/polymeric metal complexes of the invention for activation of non-metallic surfaces. In addition, the characteristic bands of the UV and visible spectra of these solutions are shown (wavelength of the absorption maximum in nm, s=shoulder).

EXAMPLE 1

10 ml of a solution of palladium sulfate in 35% sulfuric acid (0.95 g $PdSO_4$=4.7 mM) and 0.54 g (5 mM) 2-amino-6-methylpyridine are added to 400 ml water and agitated until a homogeneous orange-colored solution has formed. Then, 8.4 g (0.15 mole) potassium hydroxide are slowly added while stirring, and the solution turns a brownish-red. It is stirred until the potassium hydroxide is completely dissolved. The potassium hydroxide must be added slowly enough to permit control of the evolution of heat. Next, 5 g (0.98 mole) boric acid are added, and stirred until complete dissolution. The pH value of this solution is then adjusted to 10 by addition of soda lye or sulfuric acid, and the volume adjusted to 0.5 l. The solution thereby obtained is heated for approximately 6 hours to 50° to 60° C. The hue of the solution will become darker and change to a reddish-brown, yet remain clear. This change and deepening of color is the visual sign that the oligomerization/polymerization process is taking place. After dilution with water to 2.5–5 liters (corresponding to a palladium concentration of 100–200 mg/l), the solution is ready for activation of substrates in the manufacture of printed circuit boards for the electronics industry. Soda lye or sulfuric acid is used to readjust the pH value should the dilution result in a pH value which deviates from the desired one. Upon formation of the oligomeric/polymeric complexes the following UV bands are observed: 250 nm (s), 305 nm (s), 420 nm (s). Prior to the formation of the complexes, the UV absorption bands of the solution are: 250 nm (s), 305 nm (s), 395 nm (s). Thus, the third absorption band has shifted by 25 nm to longer wavelengths, demonstrating the occurence of polymerization.

EXAMPLE 2

10 ml of a solution of palladium sulfate in sulfuric acid (0.95 g $PdSO_4$=4.7 mM) and 0.54 g (5 mM) 2-amino-3-methylpyridine are added to 2 liters water and stirred until the solution becomes clear and homogeneous. The solution is adjusted to pH 11 with soda lye and heated for 6 hours to 60° C. After a possible dilution to achieve the desired palladium concentration, the pH is adjusted to the desired value with soda lye or sulfuric acid. Upon formation of the oligomeric/polymeric complexes the following UV bands are observed: 250 nm (s), 305 nm (s), 410 nm (s). Prior to the formation of the complexes, the UV absorption bands of the solution are: 250 nm (s), 300 nm (s), 360 nm (s). Thus, the third absorption band has shifted by 50 nm to longer wavelengths, demonstrating the occurence of polymerization.

EXAMPLE 3

10 ml of a solution of palladium sulfate in sulfuric acid (0.95 g $PdSO_4$=4.7 mM) are added to 400 ml water in which 0.54 g (5 mM) 3-ethylpyridine has been dissolved. One gram boric acid is added while stirring, and the solution is stirred until complete dissolution. The pH value of the solution is adjusted toll with soda lye, and then the volume is adjusted to 500 ml with water. The oligomeric complex has formed after 24 hours at 60° C., and the solution can be diluted to a palladium concentration of approximately 150 mg/l. UV: 265 nm, 295 nm (s).

EXAMPLE 4

0.5 g (4.7 mM) of palladium dust is mixed with 3 ml concentrated nitric acid; the solution is heated to approximately 90° C. until the palladium has dissolved completely. This solution is added to a solution of 0.65 g (5 mM) phthalazine in 4 liters water and mixed. Next, 10 g (0.17 mole) acetic acid is added and mixed. The pH value is then adjusted to 5 with soda lye. The solution is ready for use after 12 hours of heating to 50° C. UV: 235 nm, 255 nm, 315 nm, 325 nm.

EXAMPLE 5

1.3 g (4.9 mM) $PdBr_2$ are dissolved in 10 ml 10% hydrochloric acid while heating and stirring. 0.43 g (5 mM) piperazine is added and stirred until dissolution. After dilution to 2.5 liters, 4.2 g (0.07 mole) acetic acid is added and dissolved by stirring. The pH is adjusted to 12 with soda lye. The solution is ready for use after 6 hours of heating to 60° C. UV: 300 nm (s).

EXAMPLE 6

0.42 g (2.4 mM) $PdCl_2$ is dissolved in a mixture of 1 ml concentrated hydrochloric acid and 4 ml water while heating, and then diluted to 2 liters; 0.27 g (2.5 mM) 3-hydroxymethylpyridine is then added and mixed. Next, 10 g (0.16 mole) boric acid are added and stirred until complete dissolution. The pH value is adjusted to 9.5 with potash lye, and the oligomerization is carried out by heating to 45° C. for 36 hours. UV: 260 nm, 320 nm (s).

EXAMPLE 7

10 ml of a solution of palladium sulfate in sulfuric acid (0.95 g $PdSO_4$=4.7 mM) and 0.67 g (4 mM) cinnoline hydrochloride are added to 3 liters water and stirred until complete dissolution. After 5 g (0.08 mole) boric acid have been dissolved, the pH value is adjusted to 10.5 with soda lye; the solution is then heated for 6 hours to 60° C. If necessary, the solution is then diluted to the desired bath concentration. UV: 225 nm, 315 nm (s), 440 nm (s).

EXAMPLE 8

A solution of 1.05 g (4.7 mM) palladium acetate in 10 ml 10% hydrochloric acid is diluted to 2 liters with water, mixed with 0.75 g (5 mM) N-acetyl-6-methyl-2-aminopyridine and agitated. Five grams (0.042 mole) sodium dihydrogen phosphate are added and stirred until dissolved. Soda lye is added to attain a pH value of 7. The solution is ready for use after 5 hours at 60° C. UV: 275 nm, 390 nm (s).

EXAMPLE 9

10 ml of a solution of palladium sulfate in 35% sulfuric acid (0.95 g $PdSO_4$=4.7 mM) and 0.78 g (5 mM) 2,2'-dipyridyl are added to 200 ml water and stirred until a homogeneous solution has formed. This solution is poured slowly into a solution of 20 g sodium hydroxide in 5 liters water while stirring vigorously. The pH value is then adjusted to 12, if necessary. The solution is ready to use after 5 hours at 70° C. UV: 250 nm, 303 nm (s), 310 nm.

EXAMPLE 10

A solution as per Example 9 is prepared, but with 0.63 g (5 mM) 2-amino-4-hydroxy-6-methylpyrimidine substituted for the dipyridyl. UV: 260 nm (s), 305 nm (s), 410 nm (s).

EXAMPLE 11

10 ml of a solution of palladium sulfate in 35% sulfuric acid (0.95 g $PdSO_4$=4.7 mM) and 0.40 g (5 mM) pyridazine are added to 4 liters water and stirred. 5 g (0.08 mole) boric acid are added and stirred until completely dissolved. The pH value of the solution thus obtained is then adjusted to 11 with soda lye. It is heated for 6 hours to 60° C. Subsequently, the solution is diluted to the desired palladium concentration. UV: 240 nm (s), 275 nm, 350 nm (s).

EXAMPLE 12

A solution as per Example 11 is prepared, but with 0.56 g (5 mM) 5-amino-3,4-dimethylisoxazole (UV: 240 nm (s), 280 nm (s), 440 nm (s)) or 0.45 g (5 mM) DL-alanine (UV: 300 nm (s)) used in place of the pyridazine.

EXAMPLE 13

10 ml Of a solution of palladium sulfate in dilute sulfuric acid (0.95 g $PdSO_4$=4.7 mM) and 0.61 g (5 mM) 2-amino-4,6-dimethylpyridine are added to 2.5 liters water. After a homogeneous, yellow solution has formed, soda lye is used to adjust the pH value to 11. Next, the solution is heated to 60° C. for 12 hours. After cooling, the solution is diluted to 5 liters with isopropanol. UV: 260 nm (s), 420 nm (s).

The following example is for purposes of comparison. It describes the preparation of a solution of a monomeric complex.

EXAMPLE 14

A solution of 1.08 g (10 mM) 2-amino-4-methylpyridine in 10 ml water is mixed with a solution of 0.84 g (4.7 mM) $PdCl_2$ in 10 ml 10% hydrochloric acid. Monomeric dichloro-bis( 2-amino-4-methylpyridine) palladium (II) is generated in a form that can be filtered out.

A solution of 0.65 g (1.7 mM) [$(CH_3C_5H_3NNH_2)_2 Cl_2 Pd$] in 1 liter of water shows the typically poor adsorption characteristics of monomeric complexes, and yields unsatisfactory metallization when used under conditions comparable to those of oligomeric/polymeric complexes.

The spectroscopic methods of characterization used to evaluate the complexes of the present invention demonstrate the occurrence of polymerization of the complexes because spectroscopic methods monitor the possible electron transitions between different molecular orbitals. When polymerization takes place, equivalent molecular orbitals will split into orbitals of higher and lower energy. This leads to a shift in the resulting energy transitions that can be observed in the UV/visible spectra. In particular, the characteristic bands of the UV and visible spectra of the solutions disclosed in Examples 1–13 above demonstrate the occurrence of polymerization because they document the significant change of the UV/visible spectra during the polymerization process in the disclosed solutions. In the Example 1 the UV bands of the polymerized complex are listed at 250, 305 and 420 nm. Compared with the spectrum of the monomeric ligand recorded at comparable conditions, it is evident that a large shift to longer wavelength has taken place. Furthermore, often there are no distinct bands any more, but maxima are found as shoulders of a very broad band only (indicated by an s after the wavelength in Examples 1–13). Principles of spectroscopic properties can be found, e.g., in "Basic Principles of Organic Chemistry", pages 288 and 1399, G. D. Roberts and M. C. Caserio, W. A. Benjamin Inc., 1981.

Spectroscopic methods of characterization demonstrate the degree of polymerization of the complexes of the present invention because the amount of the above-mentioned shift and broadening of UV/visible bands is dependent on the degree of polymerization. The higher the degree of polymerization, the larger the shift of the UV/visible bands. Thus, the bands of the UV and visible spectra of the solutions disclosed in Examples 1–13 above are characteristic of the degree of polymerization.

The change of color of the solutions disclosed in Examples 1–13 above also demonstrates that the complexes have polymerized because the characteristic bands for these polymeric complexes are typically in the near UV or the short wave end of the visible spectrum. During the polymerization process these bands broaden and extend to longer wavelengths. The monomeric complexes regularly show an absorption only at the blue edge of the visible spectrum, so that the solution appears yellowish or light brown. Due to the band shift during polymerization, light absorption of the polymer complex occurs at longer wavelength as well, so that the solutions of the polymers are much darker in color, such as dark red to brown.

It is evident that the metal components are incorporated into the complex compounds of the present invention because the solutions are typically formed in an alkaline or weak acidic pH range (5 to 12 in Examples 1 to 13). Metal ions that were not part of a complex compound under these circumstances would precipitate as metal hydroxide immediately. From the absence of such a precipitation it is evident that the metal ions are firmly bound in the complex compounds.

The following example is for purposes of comparison.

EXAMPLE 15

U.S. Pat. No. 5,165,971 to Faletti describes compounds of precious metals of the groups VIII and Ib of the Periodic Table. The compounds do not include any type of oligomerization or polymerization. While U.S. Pat. No. 5,165,971 does not give a general method of preparation of the disclosed compounds, the method of preparation described in the examples comprises the steps of stirring a metal salt with a sulfopyridyl ligand at 30° to 50° C. for about 20 minutes in an appropriate solvent, and allowing the mixture to stand after cooling for about 1 to 2 hours. In attempting to prepare monomer complexes according to Examples 2 and 4 of U.S. Pat. No. 5,165,971, it was found that no solution of complexes had formed at all, but that the metal salts (copper chloride, palladium chloride) were undissolved and unreacted. This result was independent of the metal to ligand molar ratio used. Also, it was found that other sulfopropyl ligands produced the same result. Both Examples 2 and 4 of U.S. Pat. No. 5,165,971 were tried with 1-(3-sulfopropyl)pyridine, 1-(3-sulfopropyl)- 2-vinylpyridine and 1-(3-sulfopropyl)-2-methylpyridine, but solutions of complexes could not be obtained. When reaction conditions were attempted to be forced by applying temperatures of 60° to 70° C. for several hours, decomposition indicated by the appearance of a black color of metallic palladium was observed in the case of Example 2, and no reaction could be observed in the case of Example 4 of the 5,165,971 patent.

In contrast, the method for the formation of oligomeric or polymeric complexes in accordance with the preferred embodiment of the present invention comprises two steps. First, a solution of monomeric complexes is prepared. This can be achieved by reacting metal compounds with ligands in appropriate solvents. However, in those cases where water insoluble salts are used, acid is added to achieve complex formation in solution. In the second step in accordance with the preferred embodiment, the pH of the solution is adjusted to a value, so that polymerization occurs. The adjustment of the pH results in the formation of oligomers and polymers. For each system of metal and ligands the exposure of the solution of the monomer complexes to a specific pH is preferably carried out in order to obtain solutions of the oligomer/polymer complexes.

The following example describes a sequence of operations for metallization of nonconductive materials that utilizes solutions of the oligomeric/polymeric metal complexes of the invention.

EXAMPLE 16

| Desmear/de-etching process | optional |
|---|---|
| Cleaner I | |
| Rinse | |
| Cleaner II | optional |
| Rinse | |
| Etch cleaner | |
| Rinse | |
| Pre-immersion solution | |
| Activator solution | |
| Rinse | |
| Reducing agent | |
| Rinse after post-immersion solution | |
| Chemical copper | |
| Rinse | |
| Galvanic copper | optional |

With this procedure, the solutions of Examples 1 to 13 yield good to excellent coating of the non-metallic substrate with metal (transillumination test). In contrast, the solution of a monomeric complex as per Example 14 yields a very poor coating.

The following example illustrates a preferred coating protocol for the plating of through holes in printed circuit boards using the complex compounds of the present invention.

EXAMPLE 17

| 1. Desmear/de-etching process comprising: | | |
|---|---|---|
| 1a. Sweller (aqueous solution of monoalkyl ethylene glycol derivative, NaOH) | 7 min | 60° C. |
| 1b. Permanganate etching solution (aqueous solution of 60 g/l KMnO$_4$, 40 g/l NaOH) | 10 min | 75° C. |
| 1c. Reducing solution (reduction of manganese dioxide formed; aqueous solution of H$_2$O$_2$, H$_2$SO$_4$) | 5 min | 30° C. |
| 2. Rinse | 1 min | 20° C. |
| 3. Cleaner I (aqueous solution of wetting agent, NaOH) | 5 min | 60° C. |
| 4. Rinse | 1 min | 20° C. |
| 5. Cleaner II (aqueous solution of wetting agent, H$_2$SO$_4$) | 5 min | 25° C. |
| 6. Rinse | 1 min | 20° C. |
| 7. Etch cleaner (non-caustic aqueous solution of H$_2$O$_2$, H$_2$SO$_4$) | 2 min | 25° C. |
| 8. Rinse | 1 min | 20° C. |
| 9. Pre-immersion solution (aqueous solution of H$_2$SO$_4$) | 1 min | 25° C. |
| 10. Activator | 5 min | 40° C. |
| 11. Rinse | 1 min | 20° C. |
| 12. Reducing agent (aqueous solution of NaBH$_4$, NaOH) | 5 min | 25° C. |
| 13. Rinse | 1 min | 20° C. |
| 14. Electroless copper (CuSO$_4$, ethylene diamine tetraacetic acid, HCHO, NaOH) | 5 min | 27° C. |
| 15. Rinse | 1 min | 20° C. |
| 16. Electrolytic copper (CuSO$_4$, H$_2$SO$_4$, NaCl) treatment time depending upon desired thickness | | 25° C. |

It is understood that the above description of the present invention is susceptible to considerable modification, change and adaptation by those skilled in the art, and that such modifications, changes and adaptations are intended to be considered within the scope of the present invention, which is set forth by the appended claims.

What is claimed is:

1. A process for generation of metal seeds on a substrate, the process comprising:

(a) combining organic ligands comprising at least one element selected from N and O with a solution comprising a salt of at least one metal selected from the group consisting of Pd, Cu, Ag, Au, Ni, Pt, Ru, Rh, Os and Ir in water, organic solvent, or mixture thereof;

(b) heating the solution for a sufficient time for the formation of an oligomeric or polymeric complex compound comprising said organic ligands and said metal, wherein the complex compound is of the formula $((ML_nS_y)^{m\pm})_x$, wherein M is selected from said at least one metal, L is selected from said organic ligands, S is a solvent molecule or ion derived therefrom by protonation or deprotonation, n is a number from 0.5 to 6, y is a number from 0 to 6, m is a number from 0 to 3, and x is a number from 3 to 10,000;

(c) contacting a substrate with said complex compound solution;

(d) allowing sufficient time for complex compounds of said solution to absorb onto said substrate;

(e) rinsing surplus solution from said substrate; and (f) contacting said substrate with a reducing agent to form said metal seeds on said substrate.

2. The process according to claim 1, wherein the organic ligands are selected from the group consisting of 2-amino-6-methylpyridine, 2-amino-3-methylpyridine, 3-ethylpyridine, phthalazine, piperazine, 3-hydroxymethylpyridine, cinnoline, N-acetyl-2-amino- 6-methylpyridine, 2,2'-dipyridyl, 2-amino-4-hydroxy- 6-methylpyrimidine, pyridazine, 5-amino-3,4-dimethylisoxazole, 2-amino-4,6-dimethylpyridine, 2-amino-4-methylpyridine, 2-amino-4,6-dimethylisoxazole, DL-alanine and salts and mixtures thereof.

3. The process according to claim 1, further comprising increasing the pH of the solution prior to heating the solution.

4. The process according to claim 3, wherein the pH is increased to a level of from 5 to 12.

5. The process according to claim 3, wherein the pH is increased to at least neutral.

6. The process according to claim 1, wherein said metal is palladium.

7. The process according to claim 1, wherein the ratio of metal to ligand is from 5:1 to 1:8.

8. The process according to claim 1, wherein the ratio of metal to ligand is from 2:1 to 1:2.

9. The process according to claim 1, wherein said substrate is non-metallic.

10. The process according to claim 1, wherein said substrate is a component of a circuit board.

11. The process according to claim 2, wherein said metal is palladium.

12. The process according to claim 2, wherein the ratio of metal to ligand is from 5:1 to 1:8.

13. The process according to claim 2, wherein the ratio of metal to ligand is from 2:1 to 1:2.

14. The process according to claim 2, wherein said substrate is non-metallic.

15. The process according to claim 2, wherein said substrate is a component of a circuit board.

16. The process according to claim 3, wherein said metal is palladium.

17. The process according to claim 3, wherein the ratio of metal to ligand is from 5:1 to 1:8.

18. The process according to claim 3, wherein the ratio of metal to ligand is from 2:1 to 1:2.

19. The process according to claim 3, wherein said substrate is non-metallic.

20. The process according to claim 3, wherein said substrate is a component of a circuit board.

21. A process for generation of metal seeds on a substrate, the process comprising:

(a) combining organic ligands selected from the group consisting of 2-amino-6-methylpyridine, 2-amino-3-methylpyridine, 3-ethylpyridine, phthalazine, piperazine, 3-hydroxymethylpyridine, cinnoline, N-acetyl-2-amino-6-methylpyridine, 2,2'-dipyridyl, 2-amino-4-hydroxy-6-methylpyrimidine, pyridazine, 5-amino-3,4-dimethylisoxazole, 2-amino-4,6-dimethylisoxazole, DL-alanine and salts and mixtures thereof, with a solution comprising a salt of at least one metal selected from the group consisting of Pd, Cu, Ag, Au, Ni, Pt, Ru, Rh, Os and Ir in water, organic solvent, or mixture thereof;

(b) heating the solution for a sufficient time for the formation of an oligomeric or polymeric complex compound comprising said organic ligands and said metal;

(c) contacting a substrate with said complex compound solution;

(d) allowing sufficient time for complex compounds of said solution to absorb onto said substrate;

(e) rinsing surplus solution from said substrate; and (f) contacting said substrate with a reducing agent to form said metal seeds on said substrate.

* * * * *